(12) United States Patent
Iyer et al.

(10) Patent No.: US 8,701,096 B2
(45) Date of Patent: Apr. 15, 2014

(54) IN-ORDER EXECUTION IN AN ASYNCHRONOUS PROGRAMMING ENVIRONMENT

(75) Inventors: Anantharaman Palacode Narayana Iyer, Bangalore (IN); Arijit Chatterjee, Bangalore (IN); Jyoti Kishnani, Bangalore (IN)

(73) Assignee: Adobe Systems Incorporated, San Jose, CA (US)

(*) Notice: Subject to any disclaimer, the term of this patent is extended or adjusted under 35 U.S.C. 154(b) by 1184 days.

(21) Appl. No.: 12/579,532

(22) Filed: Oct. 15, 2009

(65) Prior Publication Data

US 2013/0167126 A1    Jun. 27, 2013

(51) Int. Cl.
*G06F 9/45* (2006.01)

(52) U.S. Cl.
USPC .......................................... 717/151; 718/102

(58) Field of Classification Search
None
See application file for complete search history.

(56) References Cited

U.S. PATENT DOCUMENTS

| | | | |
|---|---|---|---|
| 7,561,927 B2 * | 7/2009 | Oyama et al. ................. | 700/23 |
| 7,689,979 B1 | 3/2010 | Sawyer et al. | |
| 8,296,747 B2 * | 10/2012 | Ishizaki et al. ................ | 717/151 |
| 2005/0097538 A1 * | 5/2005 | Laura ........................... | 717/162 |
| 2008/0059677 A1 * | 3/2008 | Archer et al. ................. | 710/262 |
| 2011/0060882 A1 * | 3/2011 | Efstathopoulos ............. | 711/162 |

OTHER PUBLICATIONS

TMS320C3x/C4x Optimizing C Compiler User's Guide. Texas Instruments, Jun. 1998, 17 pages.
"Code Optimization with IBM XL Compilers." IBM, Jun. 2004, 23 pages.
"Compiler optimization" [online] Wikipedia, 2007 [retrieved on Nov. 2, 2011]. Retrieved from the internet: <URL: http://web.archive.org/web/20071113133103/http:/en.wikipedia.org/wiki/Compiler_optimization>.

* cited by examiner

*Primary Examiner* — Elias Mamo
(74) *Attorney, Agent, or Firm* — Wolfe-SBMC

(57) ABSTRACT

A computer implemented method includes receiving an ordered sequence of programming language statements, identifying a first statement and one or more second statements that are configured to be executed after the first statement, in which the first statement is configured to initiate an asynchronous task that executes asynchronously with respect to the one or more second statements, and configuring the one or more second statements to execute upon completion of the asynchronous task.

18 Claims, 11 Drawing Sheets

```
clientFunction( )
{
    int a, b, c;
    a = 1234;
    b = 5678;
    c = addAtServer(a, b);
    if (c == -1)
    {
        Alert.show("Error in computation");
    }
    Else
    {
        Alert.show("The sum of " + a.toString() + " and" + b.toString() + " = " + c.toString());
    }
}
```

FIG. 2

```
clientFunction(passedChainFunction:Function)
//code to insert an argument "passedChainFunction"
{
    int a, b, c;
    a = 1234;
    b = 5678;

function b1(r:Object):int
    //code to partition the original function in to block function b1
    {
        c = r.result;
        if (c == -1)
        {
            Alert.show("Error in computation");
        }
        else
        {
            Alert.show("The sum of " + a.toString() + " and " + b.toString() + " = " + c.toString());
        }
        passedChainFunction(r);
        //code to pass result back to caller
    }
    //end of function b1 c = addAtServer(a, b, b1);
    //code to invoke the asynchronous function; the block function b1 is passed as a
    //parameter so that the asynchronous function can execute b1
}
```

FIG. 7

```
public function F₁():void
{
    var a:int, b:int, c:int;     [S₁F₁]
    a = 1234;
    b = 5678;

c = addAtServer(a, b);        [A¹F₁]

if(c == -1)                   [S₂F₁]
    {
        Alert.show("Error in
        computation");
    }
    Else
    {
        Alert.show("The sum of " +
        a.toString() + " and " +
        b.toString() + " = " + c.toString());
    }
} //end of function F₁()
```

```
public function addAtServer(val1:int,
                            val2:int):int
{
    var hs:HTTPService= new           [S₁F₂]
    HTTPService();
    var rq:String = http://adder.com;
    rq = rq + "val1=" + val1 +
    "&val2=" + val2;

hs.addEventListener("result",handler);
    hs.addEventListener("fault",handler);
    hs.destination = rq;
    hs.method = post;

hs.send();                        [A¹F₂]

rq = null;                        [S₂F₂]

} //end of function addAtServer()
```

FIG. 10

IN-ORDER EXECUTION IN AN ASYNCHRONOUS PROGRAMMING ENVIRONMENT

BACKGROUND

A compiler is a computer program (or set of programs) that transforms source code written in a computer language into another computer language (the target language, often having a binary form known as object code) in order to create an executable program. A compiler is likely to perform many or all of the following operations: lexical analysis, preprocessing, parsing, semantic analysis, code generation, and code optimization. In programming, asynchronous events are those occurring independently of the main program flow. Asynchronous actions are actions executed in a non-blocking scheme, which allow other events in the main program flow to continue processing while the asynchronous actions are completed.

SUMMARY

This specification describes technologies relating to in-order execution of programming statements in an asynchronous programming environment. In general, one aspect of the subject matter described in this specification can be embodied in methods performed by data processing apparatus that include the actions of receiving, by the data processing apparatus, an ordered sequence of programming language statements, identifying a first statement and a second statement that is configured to be executed after the first statement, in which the first statement is configured to initiate an asynchronous task that executes asynchronously with respect to the second statements, and configuring the second statements to execute upon completion of the asynchronous task.

Other embodiments of this aspect include corresponding systems, apparatus, and computer programs, configured to perform the actions of the methods, encoded on computer storage devices. These and other embodiments can each optionally include one or more of the following features.

In some cases, identifying the first statement includes identifying a function that calls an asynchronous task. Configuring the second statement can include configuring a result handler associated with the asynchronous task to invoke the second statements upon completion of the asynchronous task.

In some examples, the method further includes the action of moving the second statement into a function, in which configuring the second statement includes configuring a result handler associated with the asynchronous task to invoke the function upon completion of the asynchronous task.

In certain implementations, the first statement and the second statement are in a first function, and the method further includes the action of identifying, in the ordered sequence of programming language statements, a third statement and one or more fourth statements, which are configured to be executed after the third statement, and configuring the one or more fourth statements to execute upon completion of the first function. The third statement can be configured to invoke the first function. Configuring the one or more fourth statements can include configuring an event handler associated with the first function to invoke the one or more fourth statements upon completion of the function.

Particular embodiments of the subject matter described in this specification can be implemented so as to realize one or more of the following advantages. The present disclosure provides a technique for developing an application, such that a compiler ensures programming statements within the application will be executed in-order even though the application can contain asynchronous functions and will be run in an asynchronous programming environment. Partitioning source code into one or more block functions and chaining the block functions together ensures that specific sections of code can be executed serially. The method of chaining block functions together to ensure in-order execution is made implicit through the use of compiler transformations and can reduce application development time. The application is not adversely affected by compiler transformations and continues to be responsive even when high latency server or service calls are in progress. Furthermore, the use of blocking calls and busy waits is not necessary. Block function chaining is useful for applications that rely on asynchronous communication between client-server devices as well for communications within individual client or server devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 illustrates an example of source code that can be used in an asynchronous programming environment.

FIG. 7 illustrates an example of source code transformed by a compiler performing the operations described in FIG. 5.

FIG. 10 shows an example of source code written for an Adobe Flex rich internet application.

DETAILED DESCRIPTION

Figure 1A:
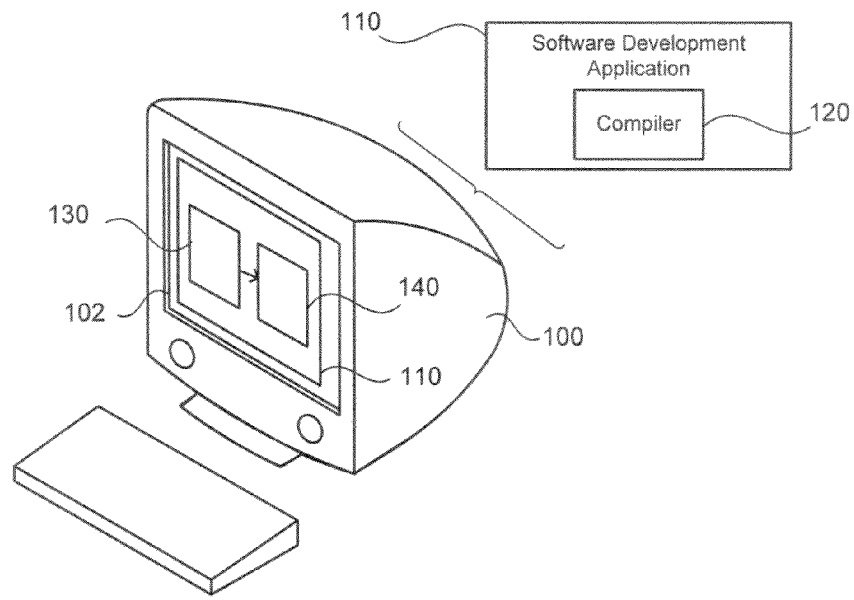
FIG. 1A illustrates an example of a system that transforms source code into an executable application.

FIG. 1A illustrates an example of a system that transforms source code into an executable application. As shown in FIG. 1, reference numeral 100 denotes an example of a computer system device on which application development software 110 may be stored and/or run. As illustrated in the example, the application development software 110 can be displayed on a graphical user interface (GUI) 102 of the computer system device 100, in which source code 130 written by the software developer is translated into an executable application 140.

Figure 1B:
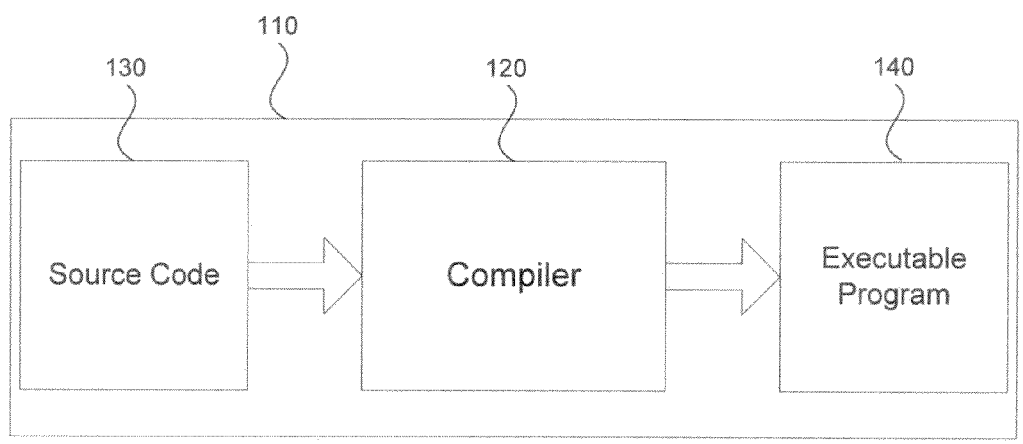
FIG. 1B illustrates an example software development process.

In various implementations, the application development software 110 can include one or more components for translating source code provided by the software developer into an executable application. For example, FIG. 1B illustrates a typical software development process in which software code 130 is passed to a compiler 120 (e.g., a process or program(s) that transforms source code into an executable form) running under the application development software 110. The compiler 120, which can be executable on the computer 100 or another computer, compiles or translates the source code 130 into the executable application 140 ready for deployment to a computing device.

The application development software 110 can also include other components. For example, the application development software 110 can include a debugger (not shown) to find and correct errors so that the executable application 140 runs or functions substantially without errors as well as a deployer (not shown) for deploying the executable application 140 to a deployment space. The deployment space can include, for example, a client computing device, a server computing device, or a virtual machine (VM) running on a client and/or server computing device. In some cases, the computing devices can include mobile/portable devices, such as a mobile telephone, a personal digital assistant (PDA), a mobile audio or video player, a game console, a Global Positioning System (GPS) receiver, or a portable storage device (universal serial bus (USB) flash drive). The mobile devices can include mobile runtime environments that support asynchronous programming.

A VM is a software implementation or simulation of a machine (e.g., a computer or an abstract machine) that executes programs. For example, a program written in Java receives services from a Java Runtime Environment (JRE) software program by issuing commands from which the expected result is returned by the Java software. By providing these services to the program, the JRE software is acting as a "virtual machine", taking the place of the operating system or hardware for which the program would ordinarily have had to have been specifically written.

The compiler 120 is a computer program (or set of programs) that translates text or symbols written in a computer programming language into another a target language, for example, to create the executable application or program 140. In various implementations, the source code 130 is a high-level programming language, which is translated into executable code (e.g., object code, intermediate code, or a lower level language, such as assembly language or machine language) of the executable application 140. For example, in some implementations, the source code 130 is written in a single programming language (e.g., Action Script, C, C++, Java, ECMAScript, Lisp or MXML), using one or more software frameworks, while, in other implementations, the source code 130 can be written in more than one programming language. A software framework is a re-usable design, component, or library for a software system (or subsystem). A software framework (e.g., Adobe® Flash®, Flex™, .NET, Dojo, GWT, Spring, Zend) can include support programs, code libraries, a scripting language, or other software to help develop and maintain the different components of a software project. In Unix and Linux, the framework concept can be mapped to System runtimes. In some implementations, the source code 130 can be other low-level languages such as "bytecodes" (e.g., Java bytecode or Actionscript bytecode) and machine code (e.g., x86, IA64, Power).

In an implementation, the application development process illustrated in FIG. 1B can entail writing source code 130, such as a Flex™ application in MXML and Actionscript, and passing the source code to a compiler 120, such as an MXML compiler. The compiler 120 then generates an executable application 140, such as a Shockwave Flash (SWF) file, that is executable on a computing device. SWF is a file format, such as the SWF File Format Specification (Version 10) as published by Adobe Systems Incorporated of San Jose, Calif. (http://www.adobe.com/devnet/swf/pdf/swf_file_format_spec_v10.pdf). The SWF file format delivers vector graphics, text, video, and sound over the Internet and is supported by Adobe® Flash® Player and Adobe® AIR™ software. For example, the computing device can execute the SWF file using Adobe® Flash® Player running on a Web browser. In another example, the application development process entails writing source code 130 in Coldfusion Markup Language (CFML) and Actionscript and passing the source code 130 to a compiler 120 such as a Coldfusion server that translates the source code 130 into an application 140 that is executable on a computing device.

In some instances, the executable application 140 provided by the compiler 120 can be based on asynchronous programming models. Asynchronous events are events which can occur independently of the main program flow. In general, programming language statements in an executable application file are executed "in-order," such that only after a statement has completed its execution will a subsequent statement proceed to execute. In some cases, a statement can be executed "out of order," such that the statement completes its execution after one or more subsequent statements in the file finish their execution. In the case of function calls, if execution of a statement proceeds only after a function call returns, the function call can be considered a synchronous call. In certain instances, such synchronous calls are referred to as "blocking calls" because they "block" the calling thread from performing any other operations until the call returns. Such synchronous calls can result in poor application performance For example, a synchronous call that sends a request for access from a client computing device to a server computing device can take a relatively long time. While the communication is in progress, the calling thread is left blocked. If the calling thread also performs user interface (UI) operations (e.g., as can occur in Flash Player), the UI is also blocked, thus preventing any user interaction. When an application makes many such synchronous calls, the application can use most of its time waiting for operations to complete.

Alternatively, if execution of a statement proceeds before the logic associated with a called function has completed, the function call can be considered an asynchronous or "non-blocking" call. Such function calls allow, for example, the user to interact with the application without getting blocked by the time-consuming function call. In general, statements that execute prior to completion of the function call do not depend on the result or return value produced by the function call. Programming models that rely on asynchronous communication include, for example, GUI intensive applications such as rich internet applications (RIAs), frameworks (e.g., .NET framework) and operating systems (e.g., Unix or Linux). RIAs are web applications that appear similar to desktop applications but are delivered by way of web browser plug-ins or independently via sandboxes or virtual machines. Examples of RIAs include applications designed for runtimes and platforms such as the Adobe® Flash®, Adobe Flex™, AIR™, Java/JavaFX, Microsoft Silverlight and Curl.

FIG. 2 illustrates an example of source code 200 that can be used in an asynchronous programming environment. Similar to code in a synchronous programming environment, code that is used in an asynchronous environment can include multiple statements to, among other things, declare procedures (such as functions or subroutines), create variables or perform operations. The example C++ code 200 includes a procedure 210 containing multiple programming statements.

The procedure 210 in the present example corresponds to a function labeled "clientFunction( )" to be executed on a client machine. Although the present function does not declare any parameters or accept any arguments in the parentheses that follow the procedure name "clientFunction," procedures that do accept parameters/arguments can be used as well.

In some cases, the function can be configured to return a value or message upon execution of one or more statements contained within each respective procedure. For example, in the present implementation, the function 210 is configured to return a message to a display. Upon invocation of the function, execution proceeds synchronously through a first group of statements 212 in which the function is declared and several integer variables are initialized. Synchronous execution means that each statement in group 212 executes upon completion of the preceding statement in the group.

Following the group 212, however, the source code 200 includes a function call statement 214 to add the integer variables "a" and "b" and return the result equal to "c." The function call statement 214 is configured, upon invocation, to execute asynchronously, in contrast to the statements in group 212. That is, after invocation, the function call statement 214 can return an asynchronous token to the application program indicating that the result is not yet ready. This is because the source code assumes in-order execution will happen.

The asynchronous token can be an identifier returned by the framework. The asynchronous call can entail, for example, initiating an asynchronous task to perform the calculation. In some cases, the asynchronous task is another program running on the same or different computing device. In some instances, the asynchronous task runs within the same executing program. For example, an asynchronous task may run in one or more threads of a program that spawns multiple threaded processes. When the service call returns, a result (or fault) handler is called. This handler is called along with an asynchronous token of the returned service call. The handler matches the supplied asynchronous token with the one returned at the time of the call to identify which of the calls has returned. The variable "c" in the example sample does not correspond to an asynchronous token. Rather, it is the actual return value.

Following the asynchronous call 214 in the source code 200 is a second group of statements 216 configured to execute synchronously. The first statement in group 216 ("if (c ==−1)") is performed immediately after the asynchronous call 214 returns and is dependent on the result returned by the call. Thus, if the asynchronous task does not complete quickly enough, the first statement in group 216 either cannot be evaluated or can be executed based on an incorrect value of "c".

Figure 3:
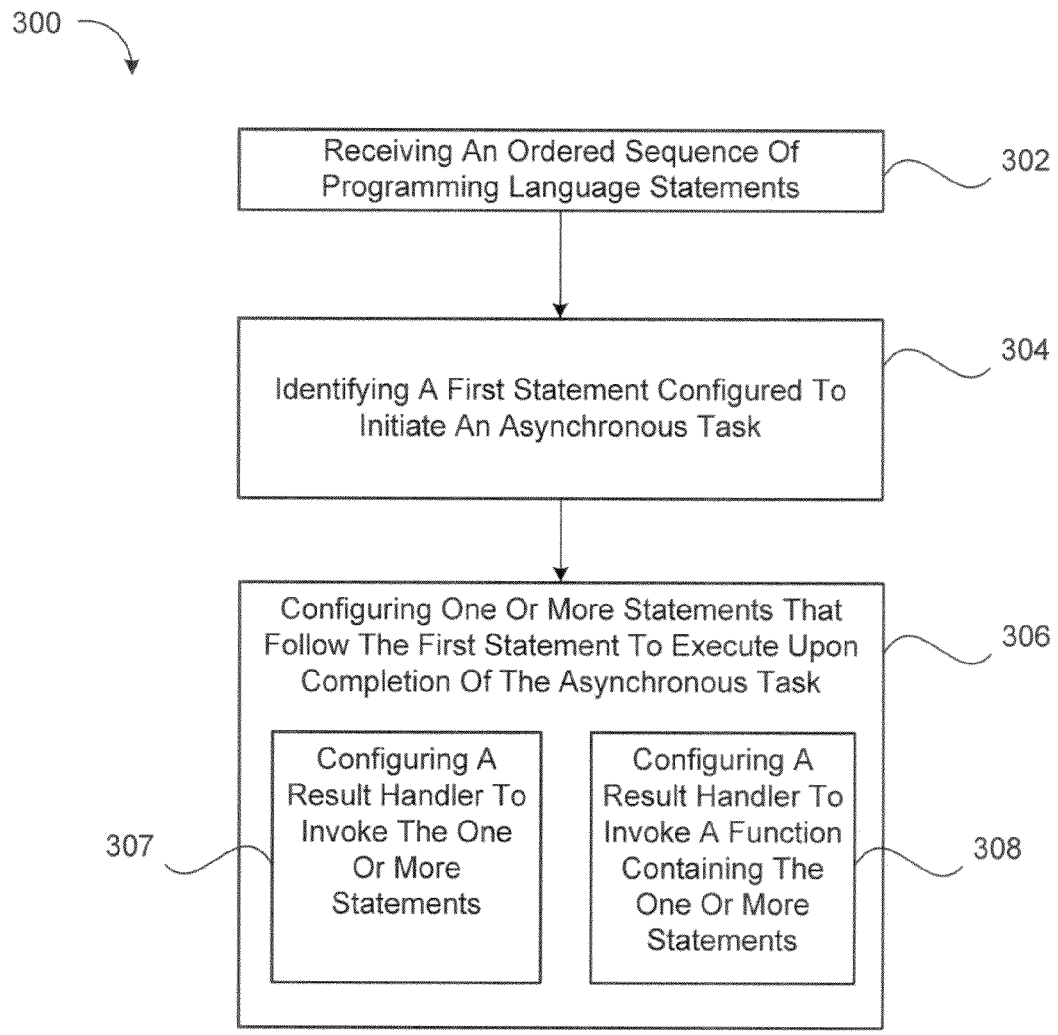
FIG. 3 shows a flow chart of example operations performed by a compiler.

In some implementations, the compiler transforms the source code to ensure in-order execution of the program statements even if one or more of the instructions are asynchronous. Referring to FIG. 3, a flow chart 300 represents example operations that can be performed by the compiler 120 to transform source code into the executable program 140. Typically, the compiler operations are executed on a processor present in the computer 100, upon which the compiler 120 resides; however, the compiling operations can also be executed by multiple processors present in the computer 100. While typically executed by a single computer 100 (e.g., electronic device or computing device), in some arrangements, operation execution can be distributed among two or more computers 100.

By way of illustration, compiling operations include: receiving an input (302), in which the input contains, for example, source code having an ordered sequence of programming language statements; identifying a statement, in the received input, that is configured to initiate an asynchronous task (304); and configuring one or more statements that follow the first statement in the received input to execute upon completion of the asynchronous task (306). The operation of identifying statements as configured to initiate an asynchronous task can include identifying functions that call asynchronous tasks. Identifying asynchronous statements (304) also can include identifying one or more statements that follow and are configured to be executed after the asynchronous statement. The operation of configuring the one or more statements to execute upon completion of the asynchronous task can include configuring a result handler to invoke the one or more statements (307) or configuring a result handler to invoke a function that contains the one or more statements (308).

Figure 4:
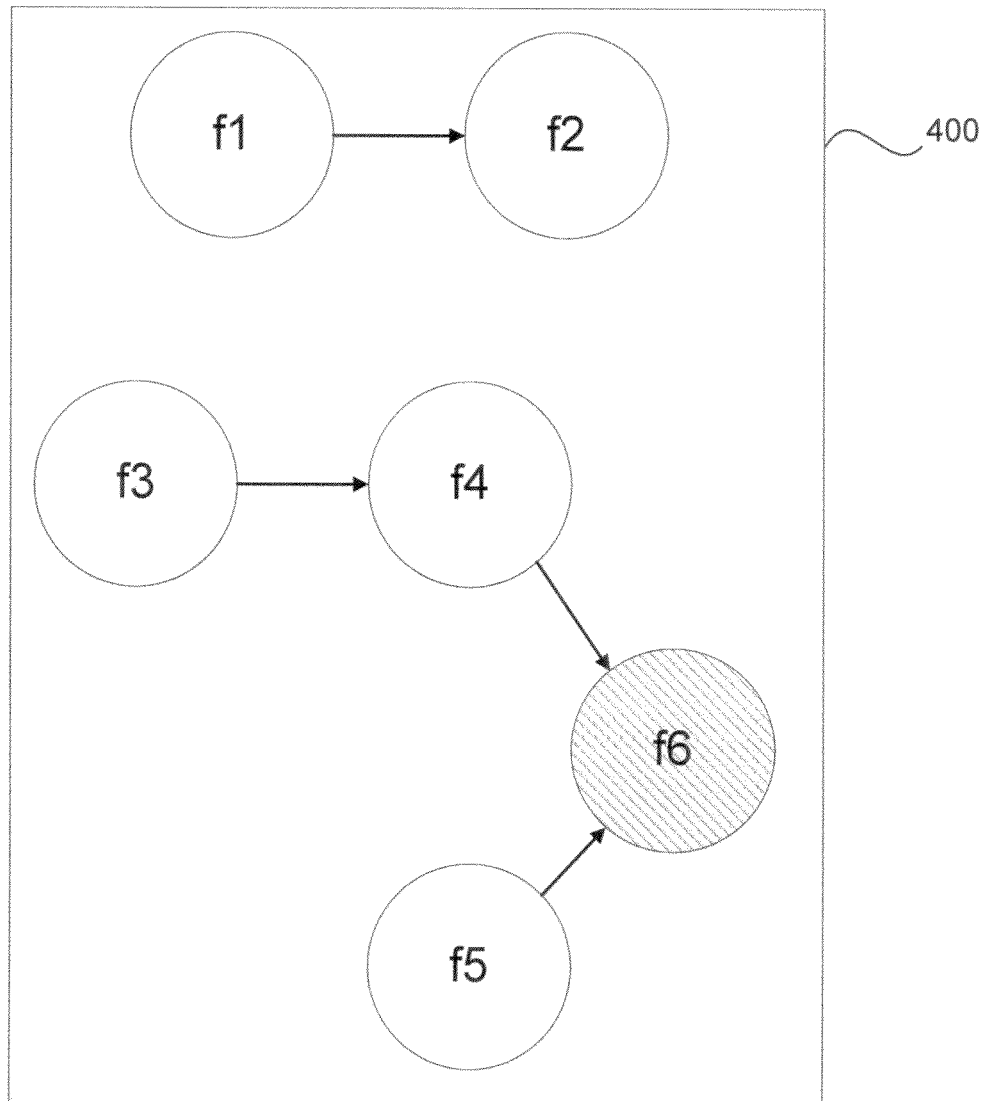
FIG. 4 shows a call graph of an example application being transformed.

Referring to FIG. 4, a diagram 400 is shown illustrating a technique representative of the operations performed by the compiler 120 to identify one or more asynchronous tasks. The chart 400 depicts a series of nodes fn, in which each node is representative of a function definition contained within source code sent to the compiler 120. That is, diagram 400 is representative of a call graph through which a compiler can traverse and perform analysis.

The nodes fn are not limited to function definitions, however, and also can be representative of instruction statements contained within the source code. The arrows 410 represent function calls linking two functions together. For example, function definition f1 can include an instruction statement that invokes function definition f2 and thus links the two function definitions together.

As shown in the example, 6 different functions (f1 . . . f6) are illustrated. The compiler 120 analyzes each function definition to determine whether any of the function definitions are "asynchronous." An asynchronous function definition is a function that contains an asynchronous call. If it is determined that one or more function definitions contain an asynchronous call, the compiler 120 then saves this information to memory. The identification of a function that contains an asynchronous call is illustrated in the chart 400 using hatch marks. In the present example, only a single function definition, f6, within the source code is configured to initiate an asynchronous task. Thus, the node f6 is shaded with hatching to represent an asynchronous function.

Once identification of the one or more functions (or instruction statements) that invoke an asynchronous task has occurred, the compiler 120 then determines whether any function definitions are dependent on the now identified asynchronous task. In some implementations, a function depends on the asynchronous task if the function invokes the function that initiates the asynchronous task. Alternatively, or in addition, a function can be dependent on an asynchronous task if the function invokes another function that is dependent on the asynchronous task.

For example, referring to FIG. 2, the asynchronous call "addAtServer()" is dependent on an asynchronous task if, when the function executes, it invokes a separate function that incorporates an asynchronous task, such as a call to a server. Alternatively, the asynchronous call can be linked to an asynchronous task if, when the function executes, it invokes a separate different function (e.g. ,$f_{diff}$), in which the separate function, $f_{diff}$, is dependent on an asynchronous task. Referring again to FIG. 4, the functions that are dependent on the asynchronous task of node f6 include function definitions f3, f4, and f5.

Once all the function definitions within the source code are evaluated, the source code then can be transformed so as to ensure that the statements execute synchronously. That is, the compiler 120 configures the function(s) identified as asynchronous to execute synchronously with statements and/or functions that follow each identified function in the source code.

Figure 5:
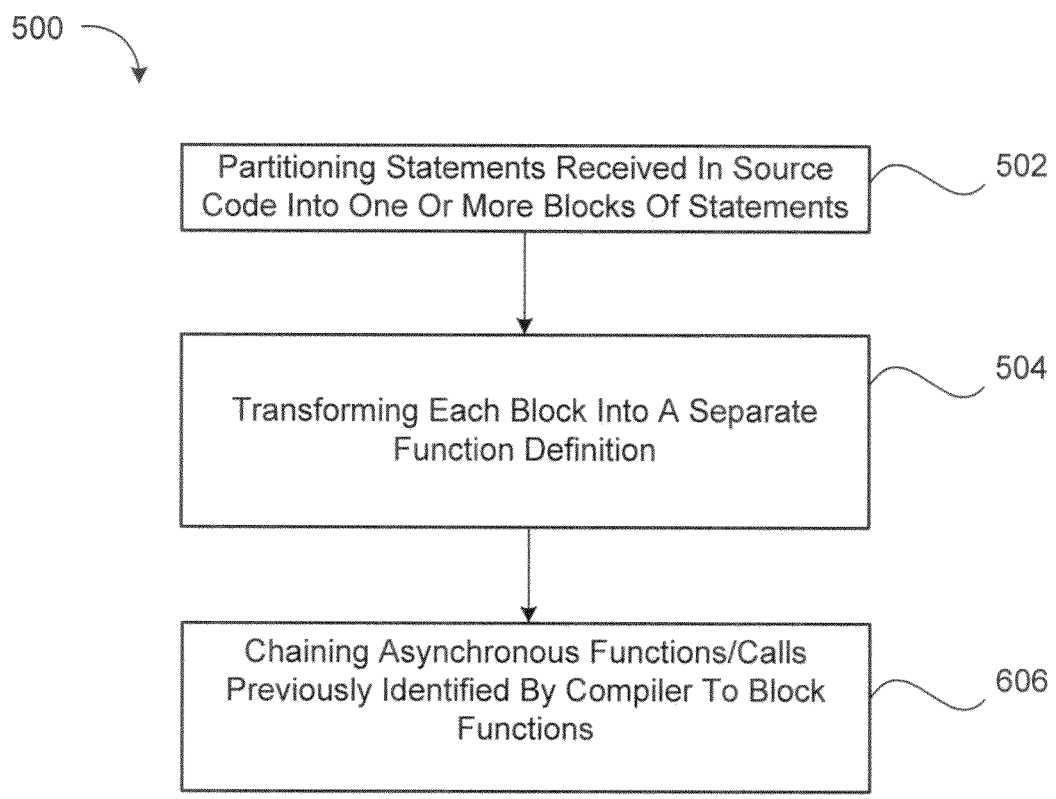
FIG. 5 shows a flow chart of example operations performed by a compiler.

Referring to FIG. 5, a flow chart 500 represents example operations that are performed by the compiler 120 to configure asynchronous functions identified in source code to execute in a synchronous manner The compiling operations include: partitioning (502) the statements in the source code into one or more blocks b0 . . . bk such that each block contains only statements that are guaranteed to execute synchronously, and in which each block ends at the boundary of an asynchronous call or a function return; transforming (504) each block bi (for i=0 . . . k) into a separate function definition, in which each block function has access to the context of the function from which it is called; and chaining (506) the asynchronous functions and/or calls (which have been identified by the compiler) with a respective block function so that each result obtained from an asynchronous function/call following a block function bi is sent to the next block function b(i+1) in the chain. By chaining the asynchronous function(s)/call(s) and block function(s) together, the program can guarantee in-order execution.

The operation of partitioning statements into one or more blocks can include, but does not require, modifying the location of the one or more statements of the source code. For example, in some cases, the compiler can move one or more statements, which are adjacent to and directly follow an asynchronous function and/or call, to a position in the source code preceding the asynchronous function/call, such that the block function ends at the boundary of the asynchronous function/call. Subsequent to partitioning, the operation of transforming the block of statements into a function definition can include, for example, adding a statement to declare the function definition. In some implementations, the function declaration statement can be configured to declare one or more parameters. In some cases, the transforming operation also can include adding a statement that returns one or more values obtained by executing one or more statements in the block function. The statement returning the one or more values can include a result handler. The result handler can send the result to one or more statements or other function definitions in the code.

In certain implementations, the transformation can include adding a call to the block function. In those cases, any value(s) returned by the block function can be sent back to the calling function. The operation of chaining together asynchronous functions/calls and block functions can include adding a block function as a parameter in the asynchronous function declaration statement. Chaining asynchronous functions/calls also can include adding a result handler statement that sends the result obtained by the asynchronous function/call to a subsequent block function in the transformed code.

Figure 6:
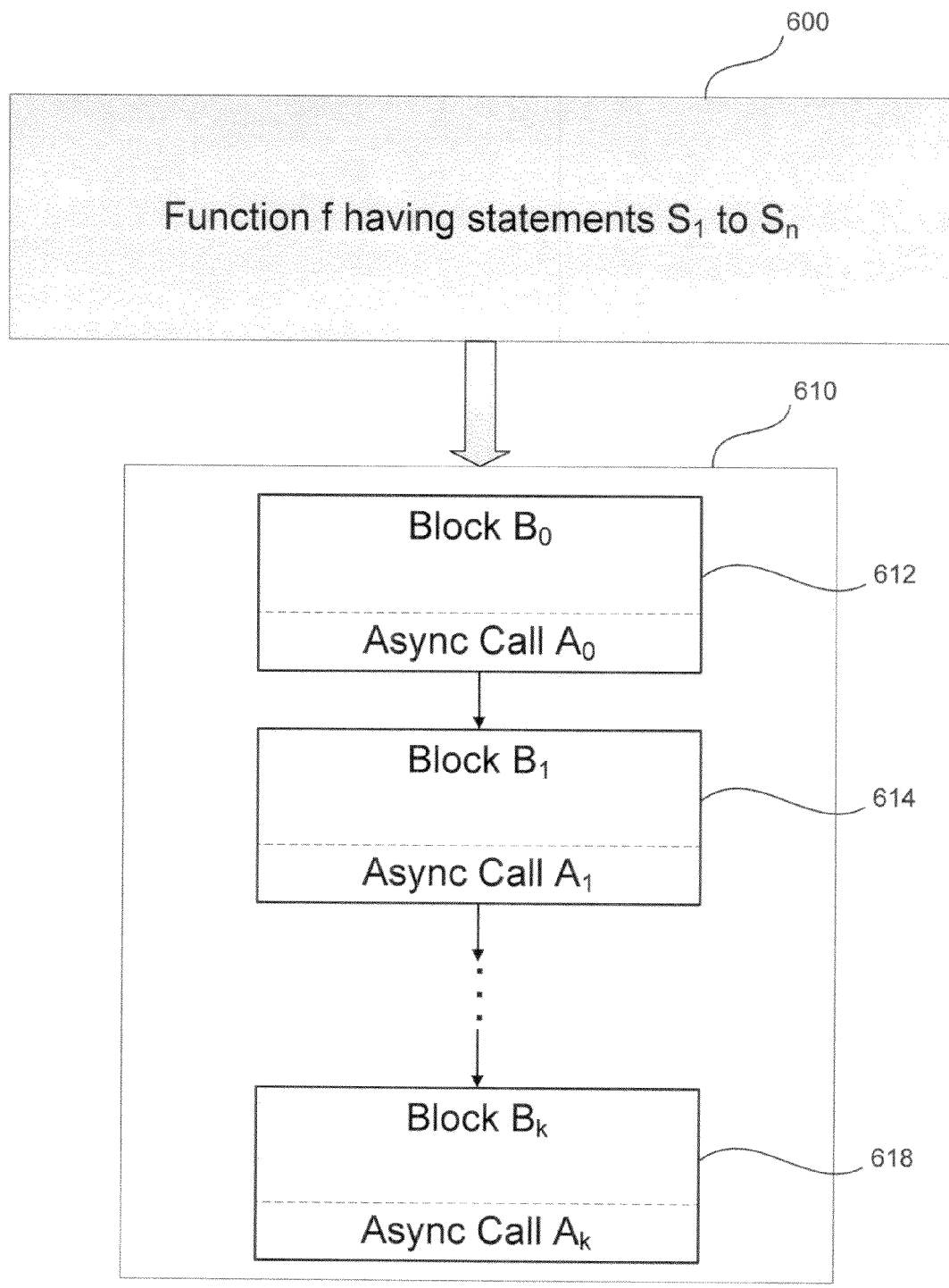
FIG. 6 illustrates a block diagram depicting the general structure of code transformed by the operations described in FIG. 5.

FIG. 6 illustrates a block diagram depicting the general structure of code transformed by the operations described in FIG. 5. Block 600 is representative of source code received by a compiler in which the code includes a function "f" having statements $S_1$ to $S_n$. Subsequent to compiling, the transformed code 610 includes one or more block functions $B_0$ . . . $B_k$, each of which includes one or more statements that are configured to execute synchronously. Each block function ends at the boundary of an asynchronous function/call A. The asynchronous calls, in turn, are linked, through a result handler, to the next block function in the transformed code 610. For example, as shown in FIG. 6, after a first block function $B_0$ executes, the asynchronous call $A_0$ is invoked. Execution of block function $B_1$ does not proceed, however, until the asynchronous call has completed and the result handler associated with $A_0$ passes the result of the call to block function $B_1$. After execution of the final asynchronous call $A_k$ in the transformed code 610, the result handler associated with call $A_k$ can pass the result to a calling function or the program may end.

FIG. 7 illustrates an example of source code transformed by a compiler performing the operations described in FIG. 5. In this particular example, the code 700 is obtained by transforming the source code 200 shown in FIG. 2. The transformed code 700 includes a single block function "b1" obtained by partitioning source code 200. To simplify analysis, the transformed code 700 is arranged into three separate groups of statements (712, 714, 716). At least some of the statements in code 700 correspond to comments, in which the beginning of each comment is preceded by two forward slashes.

The first group 712 of statements in the transformed code 700 is essentially identical to the first group 212 illustrated in FIG. 2. A distinction between the two groups of statements, however, is that the function 210 has been modified to receive the argument parameter "passedChainFunction:Function." By configuring the function 210 to receive this argument, the function 210 can pass any results obtained during its execution to a procedure that initially called function 210.

The second group 714 of statements includes a new function definition 713 generated by the compiler. Function definition 713 contains a series of statements from source code 200 that are configured to execute synchronously and that have been partitioned and transformed by the compiler into a block function "b1( )." Each statement in block function b1 will execute only after all the statements preceding it are executed and results, if any, are available. The statements contained in function 713 have been moved from a position directly following the asynchronous call 717 to a position that precedes the asynchronous call 717. Accordingly, the block function b1 ends at the boundary of an asynchronous call. The block function b1 also is configured to receive the argument parameter "r:Object." A statement 715 in block function b1 has been added to return the value "r" back to the procedure that initially called function 210. That is, the result handler is configured to extract the result from the asynchronous call return object, "r". The value from "r" then can be assigned to a parameter in the next block in the block chain.

The third group 716 of statements includes the asynchronous call 717. As shown in the example, the asynchronous call has been modified by the compiler to receive, as an argument parameter, the block function b1, in addition to the integer values "a" and "b." Upon invocation of the asynchronous call 717, the integer values "a" and "b" are added using an asynchronous procedure. Subsequent to the addition of those values, the "addAtServer" function then invokes the block function b1. In particular, the asynchronous call 717 has been modified so that it includes a result handler configured to pass the result of adding integers "a" and "b" to the block function b1. In other words, the asynchronous call is chained to block function b1. Once the result has been passed to block function b1, the statements within function definition 713 are executed in a synchronous manner. Thus, by transforming the synchronous statements which follow the asynchronous call into a block function and chaining the asynchronous call to the block function, it is possible to ensure execution of the program statements in the order defined by the program. Between executions of block functions, events that do not depend on a result from a previous block function, can be executed by the control framework. For example, a user interface can complete a rendering cycle or a non-blocking call can be invoked. The framework and the runtime can perform a series of render and compute cycles (e.g., updating logs or scheduling tasks to be taken up by the framework). As a result, the program still operates in an asynchronous manner, although statements will be executed per the order defined by the program.

Figure 8:
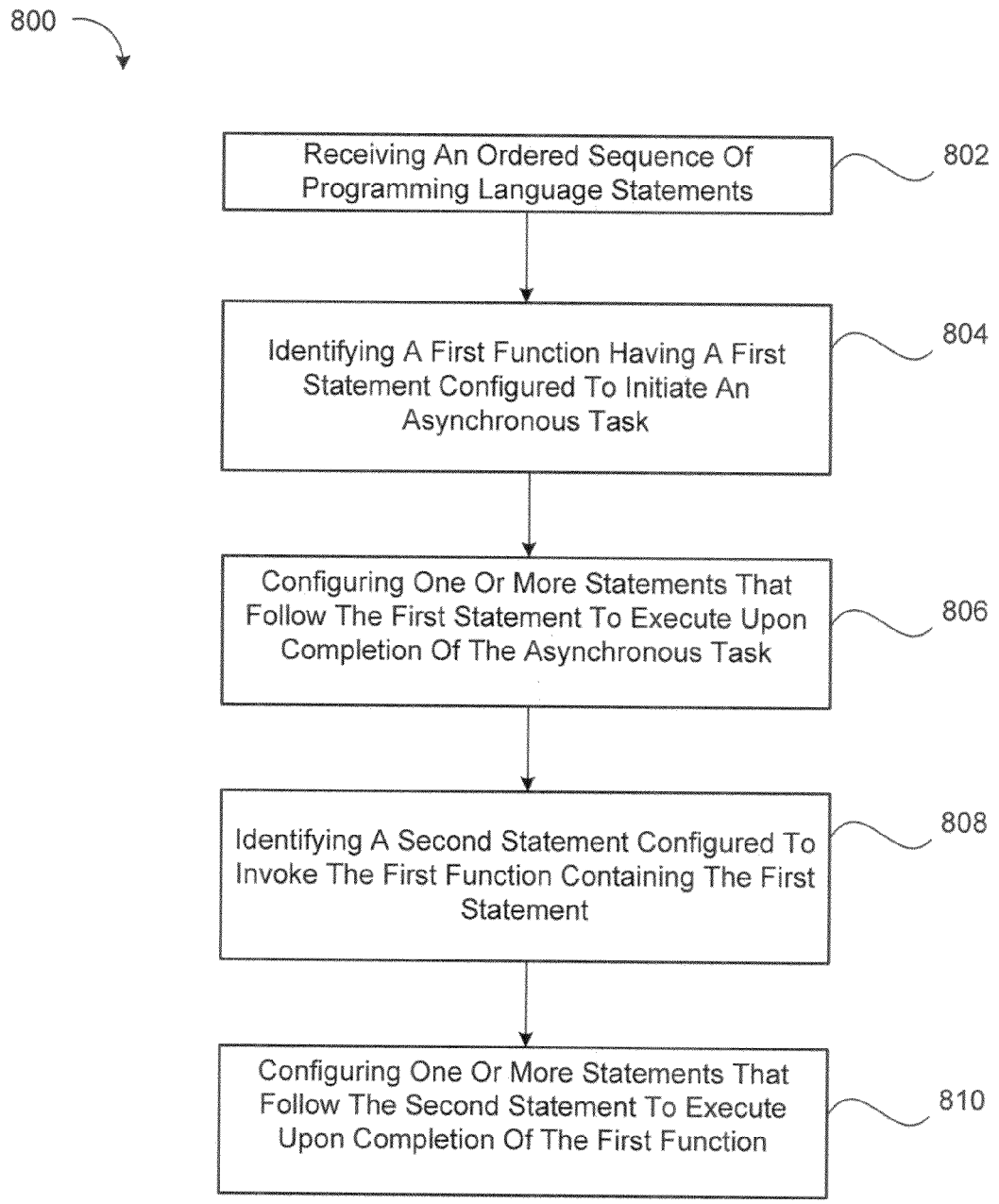
FIG. 8 shows a flow chart of example operations performed by a compiler.

As explained above, a function can be asynchronous even if the function includes a call to another different function that invokes the asynchronous task. In those instances, the compiler can transform the other different function to include an event handler that returns one or more results to the calling function so as to ensure in-order execution of the program code. Referring to FIG. 8, a flow chart 800 represents example operations that can be performed by a compiler to transform source code into an executable program. Compiling operations include: receiving an input (802), in which the input contains, for example, source code having an ordered sequence of programming language statements; identifying a first function, in the received input, that contains a statement configured to initiate an asynchronous task (804); configuring one or more statements that follow the first statement to execute upon completion of the asynchronous task (806); identifying a second statement, in the received input, that is configured to invoke the first function (808); and configuring one or more statements that follow the second statement to execute upon completion of the first function (810). The operation of configuring the one or more statements that follow the first statement to execute upon completion of the asynchronous task can include configuring a result handler to invoke the one or more statements. The operation of configuring the one or more statements that follow the second statement to execute upon completion of the first function can include configuring an event handler to invoke the one or more statements.

Figure 9:
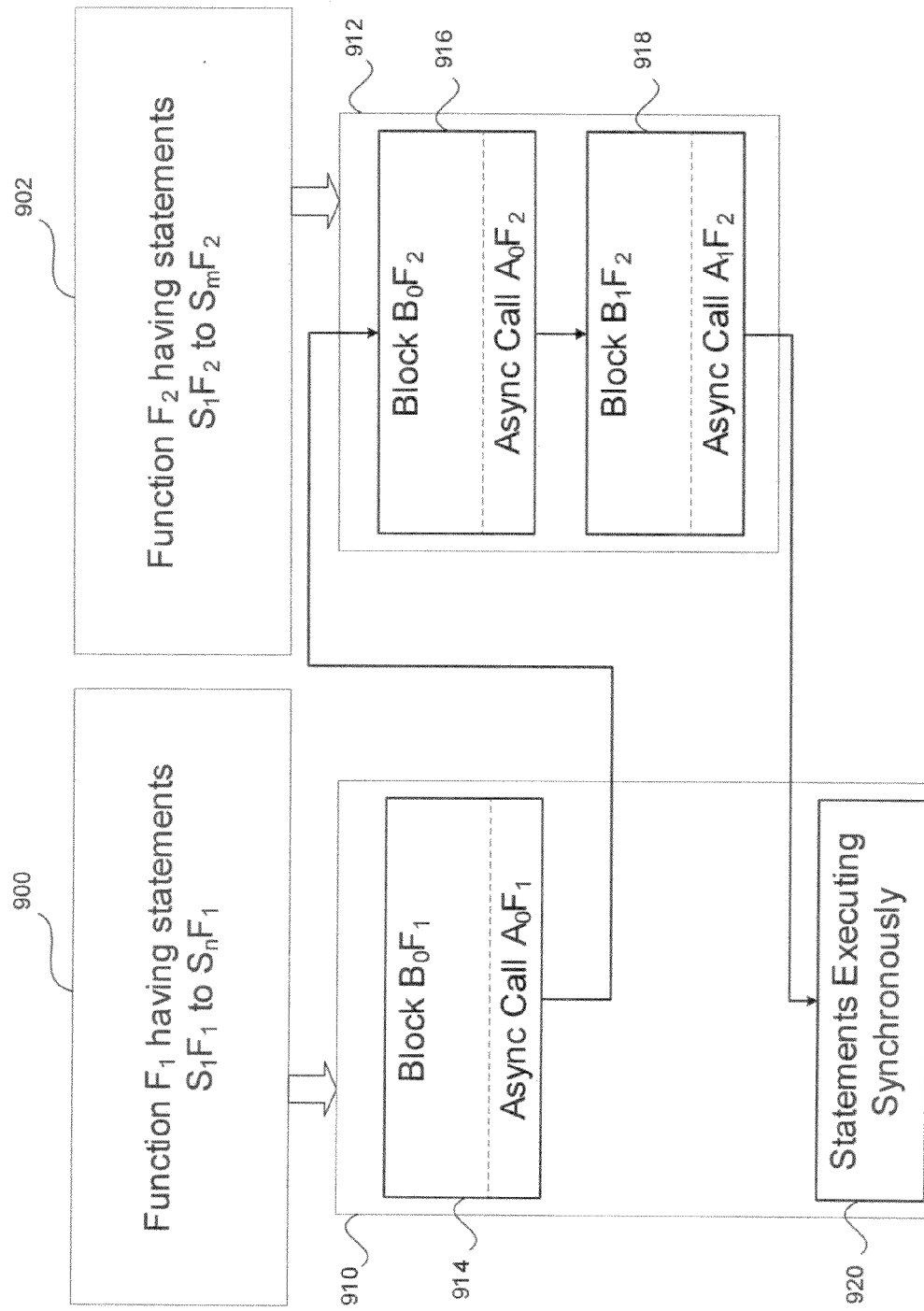
FIG. 9 illustrates a block diagram depicting the structure of code transformed by the operations described in FIG. 8.

FIG. 9 illustrates a block diagram depicting the general structure of code transformed by the operations described in FIG. 8. Blocks 900 and 902 are representative of source code received by a compiler, in which block 900 defines a function "$F_1$" having statements $S_1F_1$ to $S_nF_1$. Block 902 is representative of source code that defines a function "$F_2$" having statements $S_1F_2$ to $S_mF_2$. Both source code 900 and source code 902, and therefore functions $F_1$ and $F_2$, can be a part of the same application file. Alternatively, the functions can be in different files or machines as long as they are available for compilation.

Subsequent to compiling, function $F_1$ is represented by transformed code 910 and includes a block function $B_0F_1$, which ends at the boundary of an asynchronous call $A_0F_1$. Similarly, function $F_2$ is represented by transformed code 912 and includes block function $B_0F_2$, which ends at the boundary of asynchronous call $A_0F_2$, and block function $B_1F_2$, which ends at the boundary of asynchronous call $A_1F_2$. As before, each block function can contain one or more statements that are configured to execute synchronously.

As shown in the example, the program functions are forced to be executed in-order. In particular, execution is forced to proceed initially from block function $B_0F_1$ to asynchronous call $A_0F_1$, which invokes function $F_2$. Execution of function $F_2$ then entails synchronous execution of one or more program statements within block function $B_0F_2$. Following the execution of those statements, the asynchronous call $A_0F_2$ is invoked and subsequently linked, through a result handler, to the block function $B_1F_2$. After execution of the program statements in $B_1F_2$, the asynchronous call $A_1F_2$ is invoked and subsequently linked, through another result handler, back to the function $F_1$. In particular, the asynchronous call $A_1F_2$ can be linked to one or more statements in function $F_1$ that are configured to execute synchronously. Alternatively, the call $A_1F_2$ can be linked to another function.

FIG. 10 is an example of source code 1000 written in a Flex programming framework for the Adobe Flash rich internet application, prior to transformation by a compiler, in which the code 1000 contains two separate functions, $F_1$ and addAtServer. The code contained in function $F_1$ is similar to the code shown in FIG. 2 and can be executed on a client machine following compiling, debugging and deploying. The code contained in function addAtServer is invoked by function $F_1$ and can be executed on a server machine following compiling, debugging and deploying. The function addAtServer corresponds to an asynchronous function given that it includes a call to an asynchronous task $A_1F_2$. Similarly, function F1 also is asynchronous due to its invocation A1F1 of function addAtServer. In the present example, function addAtServer calls into the framework API to make an asynchronous call. The framework, in turn, can make additional fundamental/low level calls using the runtime APIs. Some calls to the framework can result in the framework making a call to the Flash Player while some other calls to the framework can be handled entirely in the framework.

Figure 11:
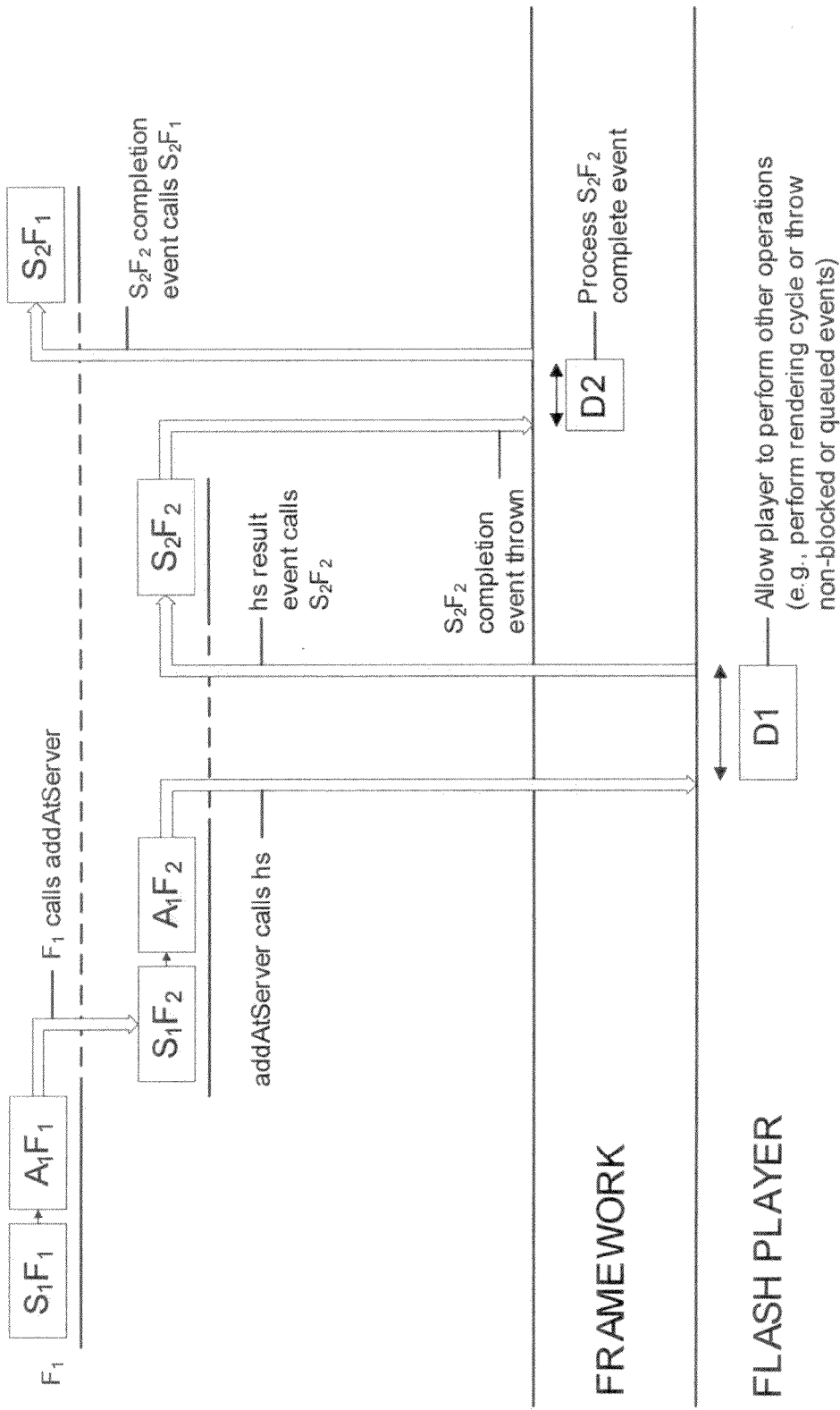
FIG. 11 illustrates a timing diagram for execution of the code shown in FIG. 10.

Function $F_1$ also includes a series of first synchronous statements $S_1F_1$ that precede the asynchronous call $A_1F_1$ and a series of second synchronous statements $S_2F_1$ that follow the asynchronous call. Function addAtServer includes a series of first synchronous statements $S_1F_2$ that precede the asynchronous task $A_1F_2$ and a second statement $S_2F_2$ that follows the asynchronous task $A_1F_2$. FIG. 11 shows a sequence diagram that illustrates the execution sequence of the programming statements in FIG. 10 after the code has been compiled, debugged and deployed. The programming statements are executed in a rich internet application (e.g., Adobe® Flash® Player) running on an asynchronous framework such as Adobe® Flex™. The sequence diagram has time on the horizontal axis and the different levels of code on the vertical axis. These are the concepts used to show an elapsed time sequence of how the code blocks are sequenced.

As shown in FIG. 11, execution proceeds initially from the synchronous statements $S_1F_1$ in function $F_1$. The synchronous statements $S_1F_1$ end at the boundary of the asynchronous call $A_1F_1$ which invokes the asynchronous function addAtServer. The function addAtServer then executes synchronous statements $S_1F_2$ before reaching a call to the asynchronous task $A_1F_2$. The asynchronous task $A_1F_2$ ("hs.send( )") is an HTTPService call and is an example of an asynchronous call. The "hs.send( )" denotes the calling of the send method, which performs the actual task of sending the asynchronous call request to the service endpoint. Other service calls can include, for example, a SOAP based webservice or a Remote procedure Call.

Execution of the asynchronous task occurs during period D1. During that time period, the Flash Player is free to perform other operations without blocking calls or being forced to wait for a response from the task $A_1F_2$. For example, the Flash Player can perform a user interface rendering cycle, throw a non-blocked call, or throw a queued event. Other non-blocking operations can be performed during the period D1 as well. Accordingly, the program and user do not experience a delay in response time. Thus, although the statements are forced to execute in-order, asynchronous functions are not forced to operate synchronously and valuable processing resources are not blocked from being used. Rather, the program is converted into synchronous portions that are chained together so they execute per the program order.

Once the asynchronous task $A_1F_2$ has completed, a result handler associated with task $A_1F_2$ returns a result to the synchronous statement $S_2F_2$. The synchronous statement $S_2F_2$ then is executed and is configured, as a result of the compiling operations, to throw an event handler signaling the completion of the asynchronous function addAtServer. The event handler passes the result obtained by the asynchronous function addAtServer to the synchronous statements $S_2F_1$ at the end of function $F_1$. The processing of the event handler occurs within the framework during period D2. Once the result from the event handler is received, the synchronous statements within $S_2F_1$ are executed and the program ends.

Various implementations of the systems and techniques described here (e.g., the compiler 120, software development application 110, RIAs) can be realized in digital electronic circuitry, integrated circuitry, specially designed ASICs (application specific integrated circuits), or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
   receiving, by the data processing apparatus and using a compiler, an ordered sequence of programming language statements;
   identifying, with the compiler, a first statement and one or more second statements that are configured to be executed after the first statement, the first statement configured to initiate an asynchronous task that executes asynchronously with respect to the one or more second statements; and
   configuring, with the compiler, the one or more second statements to execute synchronously upon completion of the asynchronous task, the configuring including modifying a location of the one or more second statements to partition the one or more second statements into one or more blocks containing statements that execute synchronously.

2. The method of claim 1, wherein identifying a first statement comprises identifying a function that calls an asynchronous task.

3. The method of claim 1, wherein configuring the one or more second statements comprises configuring a result handler associated with the asynchronous task to invoke the one or more second statements upon completion of the asynchronous task.

4. The method of claim 1, further comprising moving the one or more second statements into a function, and
   wherein configuring the one or more second statements comprises configuring a result handler associated with the asynchronous task to invoke the function upon completion of the asynchronous task.

5. The method of claim 1, wherein the first statement and the one or more second statements are in a first function, the method further comprising:
   identifying a third statement and one or more fourth statements that are configured to be executed after the third statement in the ordered sequence of programming language statements, wherein the third statement is configured to invoke the first function; and
   configuring the one or more fourth statements to execute upon completion of the first function.

6. The method of claim 5, wherein configuring the one or more fourth statements comprises configuring an event handler associated with the first function to invoke the one or more fourth statements upon completion of the function.

7. A computer storage medium encoded with a computer program, the program comprising instructions that when executed by a data processing apparatus cause the data processing apparatus to perform operations comprising:
   receiving, by the data processing apparatus and using a compiler, an ordered sequence of programming language statements;
   identifying, with the compiler, a first statement and one or more second statements that are configured to be executed after the first statement, the first statement configured to initiate an asynchronous task that executes asynchronously with respect to the one or more second statements; and
   configuring, with the compiler, the one or more second statements to execute synchronously upon completion of the asynchronous task, the configuring including modifying a location of the one or more second statements to partition the one or more second statements into one or more blocks containing statements that execute synchronously.

8. The computer storage medium of claim 7, wherein identifying a first statement comprises identifying a function that calls an asynchronous task.

9. The computer storage medium of claim 7, wherein configuring the one or more second statements comprises configuring a result handler associated with the asynchronous task to invoke the one or more second statements upon completion of the asynchronous task.

10. The computer storage medium of claim 7, wherein the operations further comprise moving the one or more second statements into a function, and
wherein configuring the one or more second statements comprises configuring a result handler associated with the asynchronous task to invoke the function upon completion of the asynchronous task.

11. The computer storage medium of claim 7, wherein the first statement and the one or more second statements are in a first function, and the operations further comprise:
identifying a third statement and one or more fourth statements that are configured to be executed after the third statement in the ordered sequence of programming language statements, wherein the third statement is configured to invoke the first function; and
configuring the one or more fourth statements to execute upon completion of the first function.

12. The computer storage medium of claim 11, wherein configuring the one or more fourth statements comprises configuring an event handler associated with the first function to invoke the one or more fourth statements upon completion of the first function.

13. A system comprising:
a computer-readable medium including instructions for a compiler; and
a computing device including one or more processors configured to interact with the medium and execute the compiler to perform operations comprising:
receiving by the compiler an ordered sequence of programming language statements;
identifying a first statement and one or more second statements that are configured to be executed after the first statement, the first statement is configured to initiate an asynchronous task that executes asynchronously with respect to the one or more second statements; and
configuring the one or more second statements to execute synchronously upon completion of the asynchronous task, the configuring including modifying a location of the one or more second statements to partition the one or more second statements into one or more blocks containing statements that execute synchronously.

14. The system of claim 13, wherein identifying a first statement comprises identifying a function that calls an asynchronous task.

15. The system of claim 13, wherein configuring the one or more second statements comprises configuring a result handler associated with the asynchronous task to invoke the one or more second statements upon completion of the asynchronous task.

16. The system of claim 13 wherein the operations further comprise moving the one or more second statements into a function, and
wherein configuring the one or more second statements comprises configuring a result handler associated with the asynchronous task to invoke the function upon completion of the asynchronous task.

17. The system of claim 13, wherein the first statement and the one or more second statements are in a first function, and wherein the operations further comprise:
identifying a third statement and one or more fourth statements that are configured to be executed after the third statement in the ordered sequence of programming language statements, wherein the third statement is configured to invoke the first function; and
configuring the one or more fourth statements to execute upon completion of the first function.

18. The system of claim 17, wherein configuring the one or more fourth statements comprises configuring an event handler associated with the first function to invoke the one or more fourth statements upon completion of the first function.

* * * * *

UNITED STATES PATENT AND TRADEMARK OFFICE
CERTIFICATE OF CORRECTION

PATENT NO. : 8,701,096 B2  
APPLICATION NO. : 12/579532  
DATED : April 15, 2014  
INVENTOR(S) : Iyer et al.

Page 1 of 1

It is certified that error appears in the above-identified patent and that said Letters Patent is hereby corrected as shown below:

In the Claims

Column 15, Line 33, after "the first statement" before "configured" delete "is", therefor.

Signed and Sealed this
Eighth Day of July, 2014

Michelle K. Lee
*Deputy Director of the United States Patent and Trademark Office*